US008055746B2

(12) United States Patent
Spicer et al.

(10) Patent No.: US 8,055,746 B2
(45) Date of Patent: Nov. 8, 2011

(54) METHOD AND SYSTEM FOR IMPROVED MANAGEMENT OF A COMMUNICATION NETWORK BY EXTENDING THE SIMPLE NETWORK MANAGEMENT PROTOCOL

(75) Inventors: John William Spicer, Greely (CA); Kelvin Ross Edmison, Ottawa (CA); Clarey Roland Christopher Marchand, Nepean (CA)

(73) Assignee: Alcatel Lucent, Paris (FR)

( * ) Notice: Subject to any disclaimer, the term of this patent is extended or adjusted under 35 U.S.C. 154(b) by 1252 days.

(21) Appl. No.: 11/452,922

(22) Filed: Jun. 15, 2006

(65) Prior Publication Data

US 2006/0288102 A1    Dec. 21, 2006

(51) Int. Cl.
*H04L 12/28*  (2006.01)
*G06F 13/00*  (2006.01)
*G06F 15/173* (2006.01)
(52) U.S. Cl. ........ 709/223; 709/220; 709/224; 370/389; 370/395.3
(58) Field of Classification Search .................. 709/223, 709/224; 370/402, 389
See application file for complete search history.

(56) References Cited

U.S. PATENT DOCUMENTS

| | | | | |
|---|---|---|---|---|
| 5,740,368 | A  * | 4/1998  | Villalpando | 709/202 |
| 6,003,077 | A  * | 12/1999 | Bawden et al. | 709/223 |
| 6,487,592 | B1 * | 11/2002 | Sawyer et al. | 709/223 |
| 6,757,280 | B1 * | 6/2004  | Wilson, Jr. | 370/389 |
| 7,275,094 | B1 * | 9/2007  | McCloghrie et al. | 709/223 |
| 2002/0085571 | A1* | 7/2002  | Meandzija | 370/410 |
| 2002/0156882 | A1* | 10/2002 | Natarajan et al. | 709/224 |
| 2005/0114495 | A1* | 5/2005  | Clemm et al. | 709/224 |
| 2006/0271657 | A1* | 11/2006 | Mendiratta et al. | 709/223 |
| 2007/0180086 | A1* | 8/2007  | Fang et al. | 709/223 |

OTHER PUBLICATIONS

A Simple network management Protocol (SNMP), IETF draft, rfc1157, J. Case, M. Fedor, et al, May 1990.

* cited by examiner

*Primary Examiner* — Ian N Moore
*Assistant Examiner* — Thai Nguyen
(74) *Attorney, Agent, or Firm* — IP-MEX Inc.

(57) ABSTRACT

The invention provides an improved management of network devices in a communication network by extending the Simple Network Management Protocol (SNMP), which provides an effective identifying of the Management Client originating a request and sends rich textual status and error responses from the network device.

14 Claims, 4 Drawing Sheets

METHOD AND SYSTEM FOR IMPROVED MANAGEMENT OF A COMMUNICATION NETWORK BY EXTENDING THE SIMPLE NETWORK MANAGEMENT PROTOCOL

FIELD OF THE INVENTION

The invention relates to communication networks, and in particular to a method and system for identifying the Management Client originating a request for a network device managed by the Simple Network Management Protocol (SNMP) and for reporting status and error response from the network device.

BACKGROUND OF THE INVENTION

A communication network includes various devices that are managed by Management Clients. A common protocol used for inter-communication between a Management Client and a network device is SNMP. An SNMP SET request is used for example by a Management Client to set the parameters of the managed device. A GET request on the other hand is issued by a management client to retrieve the status of the last operation. Multiple Management Clients can interact with the managed device through an SNMP Manager. Such an SNMP Manager can be embedded inside the device or can be an independent entity outside the managed device. Multiple SNMP managers, each of which may be connected to multiple Management Clients can interact with the device via an SNMP Agent.

The typical operation of an SNMP Managed Device is explained with the help of FIG. 1. Four management clients (102, 104, 108, 110) and an SNMP Managed Device 101 that includes a Web Interface 112, a Command Line Interface 114, an embedded SNMP Manager 116 and an SNMP Agent 118 are shown in the figure. Management Client 102 is connected through a Web Interface 112 with the embedded SNMP Manager 116 whereas Management Client 104 is connected to the embedded SNMP Manager 116 though a Command Line Interface 114. Various protocols may be used for communication by the Management Clients to communicate with an SNMP Manager. Management Client 102 in FIG. 1, for example, uses HTTP whereas Management Client 104 uses Telnet for inter-communicating with the embedded SNMP Manager 116. The embedded SNMP Manager 116 in turn is connected to an SNMP Agent 118. Two other Management Clients 108 and 110 are connected to an SNMP Manager 106 that is connected directly to SNMP Agent 118. An SNMP Manager communicates with an SNMP Agent using the SNMP protocol.

Consider for example a user with name John using Management Client 102 with an IP address 10.1.2.1 and connecting to the Web Interface 112 on the SNMP managed device. By using a SET command, the user attempts to configure the low temperature threshold for the device to 60° C. The request fails because the threshold value must be less than the high temperature threshold, which in this example, is currently set at 60° C. There are two problems that are important in this context. The first concerns System Logging 120 in FIG. 1. The log generated by SNMP Agent 118 would only indicate the failed attempt to change the low temperature threshold by user with name 'John' (assuming SNMP v3 is used) located at the IP address of the embedded SNMP Manager 116. Note that the IP address of the Management Client 102 that originated the request is lost and only the IP address of the intermediary, the embedded SNMP Manager, which connects Management Client 102 to the SNMP Agent 118 is recorded.

The second problem is related to the restricted nature of the error response that is sent back to the user. In this example, a message containing the error-status of COMMIT_FAILED is received by the user. This second problem is caused by the limitations of the error codes supported by SNMP. SNMP requests are defined in RFC 1157 (Internet Engineering Task Force, http://www.ietf.org/rfc/rfc1157.txt). Two entities using the SNMP protocol communicate with each other by using Protocol Data Units (PDU). An important component of the SNMP PDU is a Variable Binding (VarBind) List. Each VarBind in the VarBindList is a two-tuple consisting of an Object ID (OID) and a Value. The OID uniquely addresses a specific parameter and the Value field specifies the value of this parameter.

The response to a SetRequest-PDU is a GetResponse-PDU. From RFC 1157, the GetResponse-PDU contains two fields for error reporting:
error-status of type ErrorStatus
error-index of type ErrorIndex
"Error-index" is an integer value that identifies which VarBind in the VarBindList the "error-status" applies to. The values for "error-status" are shown in Table 1.

TABLE 1

Standard SNMP Error Codes

| Error | SNMP v2c Value | SNMP v3 Value |
|---|---|---|
| NO_ERROR | 0 | 0 |
| TOO_BIG_ERROR | 1 | 1 |
| NO_SUCH_NAME_ERROR | 2 | 2 |
| BAD_VALUE_ERROR | 3 | 3 |
| READ_ONLY_ERROR | 4 | 4 |
| GEN_ERROR | 5 | 5 |
| NO_ACCESS_ERROR | n/a | 6 |
| WRONG_TYPE_ERROR | n/a | 7 |
| WRONG_LENGTH_ERROR | n/a | 8 |
| WRONG_ENCODING_ERROR | n/a | 9 |
| WRONG_VALUE_ERROR | n/a | 10 |
| NO_CREATION_ERROR | n/a | 11 |
| INCONSISTENT_VALUE_ERROR | n/a | 12 |
| RESOURCE_UNAVAILABLE_ERROR | n/a | 13 |
| COMMIT_FAILED_ERROR | n/a | 14 |
| UNDO_FAILED_ERROR | n/a | 15 |
| AUTHORIZATION_ERROR | n/a | 16 |
| NOT_WRITEABLE_ERROR | n/a | 17 |
| INCONSISTENT_NAME_ERROR | n/a | 18 |

As shown in Table 1, the values of "error-status" are limited, and for SET requests that change more than one value only one error can be reported back at a time. One approach to overcome this limitation is for an SNMP Manager to send a GET request to retrieve the status of the last operation. However, this does not work when there are multiple SNMP Managers (as in FIG. 1) communicating with the same SNMP Agent. In this scenario, there is no guarantee that another SNMP Manager will not send a request that changes the status before the first SNMP Manager is able to read it. Thus there is a need in the field for the development of an efficient method and system for identifying the Management Client that originated an SNMP request and for providing a rich textual status and error message that clearly describes the system state or the nature of an error.

SUMMARY OF THE INVENTION

Therefore it is an objective of the invention to provide an effective method and system for identifying the specific Management Client that originated a request for the network device and for reporting the status of a device through rich textual status and error messages that clearly describe the status of the device.

A method for managing a device in a communication network using Simple Network Management Protocol (SNMP), the network including the device, Management Clients originating a request for the device and SNMP Managers, the device including an SNMP Agent for processing the request and an SNMP Manager providing interface between the Management Clients and the SNMP Agent, the method comprising the steps of: identifying the Management Client originating the request by using an Embedded Management Communication Channel (EMCC) in an SNMP Protocol Data Unit (PDU); and reporting a status of the device by providing rich textual status and error message through said EMCC. The step of identifying the Management Client originating the request further comprises the steps of: incorporating an originating Management Client information into the EMCC by the SNMP Manager; and processing the request by the SNMP Agent. The step of incorporating the originating Management Client information into the EMCC further comprises the steps of: inserting information that includes user name and user Internet Protocol (IP) address in the EMCC; adding the EMCC to the SNMP PDU; and sending the SNMP PDU to the SNMP Agent. The step of processing the request by the SNMP Agent further comprises the steps of: extracting the EMCC from the SNMP PDU sent by the SNMP Manager; processing the data in the EMCC to obtain the originating Management Client information; and maintaining an association between the request and the originating Management Client information at the SNMP Agent. The step of reporting a status of the device further comprises the steps of: preparing the response by the SNMP Agent; and processing the response at the SNMP Manager. The step of preparing the response further comprises the steps of: adding the rich textual status and error message to the SNMP PDU by the SNMP Agent; and sending the SNMP PDU to the SNMP Manager. The step of processing the response further comprises the steps of: extracting the EMCC from the SNMP PDU sent by the SNMP Agent; processing the EMCC to obtain the originating Management Client information and the rich textual status and error message; and sending the rich textual status and error message to the Management Client originating the request.

A method for managing a device in a communication network using Simple Network Management Protocol (SNMP), the network including the device, a Management Client originating a request for the device, SNMP Managers providing interface between the Management Client and an SNMP Agent, the device including the SNMP Agent for processing the request, the method comprising the steps of: identifying the Management Client originating the request by using an Embedded Management Communication Channel (EMCC) in an SNMP Protocol Data Unit (PDU); and reporting a status of the device by providing rich textual status and error message through said EMCC.

A system for managing a device in a communication network using Simple Network Management Protocol (SNMP), the network including the device, Management Clients originating a request for the device and SNMP Managers, the device including an SNMP Agent for processing the request and an SNMP Manager providing interface between the Management Clients and the SNMP Agent, the system comprising: means for identifying the Management Client originating the request by using an Embedded Management Communication Channel (EMCC) in an SNMP Protocol Data Unit (PDU); and means for reporting a status of the device by providing rich textual status and error message through said EMCC. The means for identifying the Management Client originating the request further comprises: means for incorporating an originating Management Client information into the EMCC by the SNMP Manager; and means for processing the request by the SNMP Agent. The means for incorporating the originating Management Client information into the EMCC further comprises: means for inserting information that includes user name and user Internet Protocol (IP) address in the EMCC; means for adding the EMCC to the SNMP PDU; and means for sending the SNMP PDU to the SNMP Agent. The means for processing the request by the SNMP Agent further comprises: means for extracting the EMCC from the SNMP PDU sent by the SNMP Manager; means for processing the data in the EMCC to obtain the originating Management Client information; and means for maintaining an association between the request and the originating Management Client information at the SNMP Agent. The means for reporting the status of the device further comprises: means for preparing the response by the SNMP Agent; and means for processing the response at the SNMP Manager. The means for preparing the response further comprises: means for adding the rich textual status and error message to the SNMP PDU by the SNMP Agent; and means for sending the SNMP PDU to the SNMP Manager. The means for processing the response further comprises: means for extracting the EMCC from the SNMP PDU sent by the SNMP Agent; means for processing the EMCC to obtain the originating Management Client information and the rich textual status and error message; and means for sending the rich textual status and error message to the Management Client originating the request.

A system for managing a device in a communication network using Simple Network Management Protocol (SNMP), the network including the device, a Management Client originating a request for the device, SNMP Managers providing interface between the Management Client and an SNMP Agent, the device including the SNMP Agent for processing the request, the system comprising: means for identifying the Management Client originating the request by using an Embedded Management Communication Channel (EMCC) in an SNMP Protocol Data Unit (PDU); and means for reporting a status of the device by providing rich textual status and error message through said EMCC.

BRIEF DESCRIPTION OF THE DRAWINGS

Further features and advantages of the invention will be apparent from the following description of the embodiment, which is described by way of example only and with reference to the accompanying drawings in which.

DETAILED DESCRIPTION OF THE EMBODIMENT OF THE INVENTION

Figure 1:
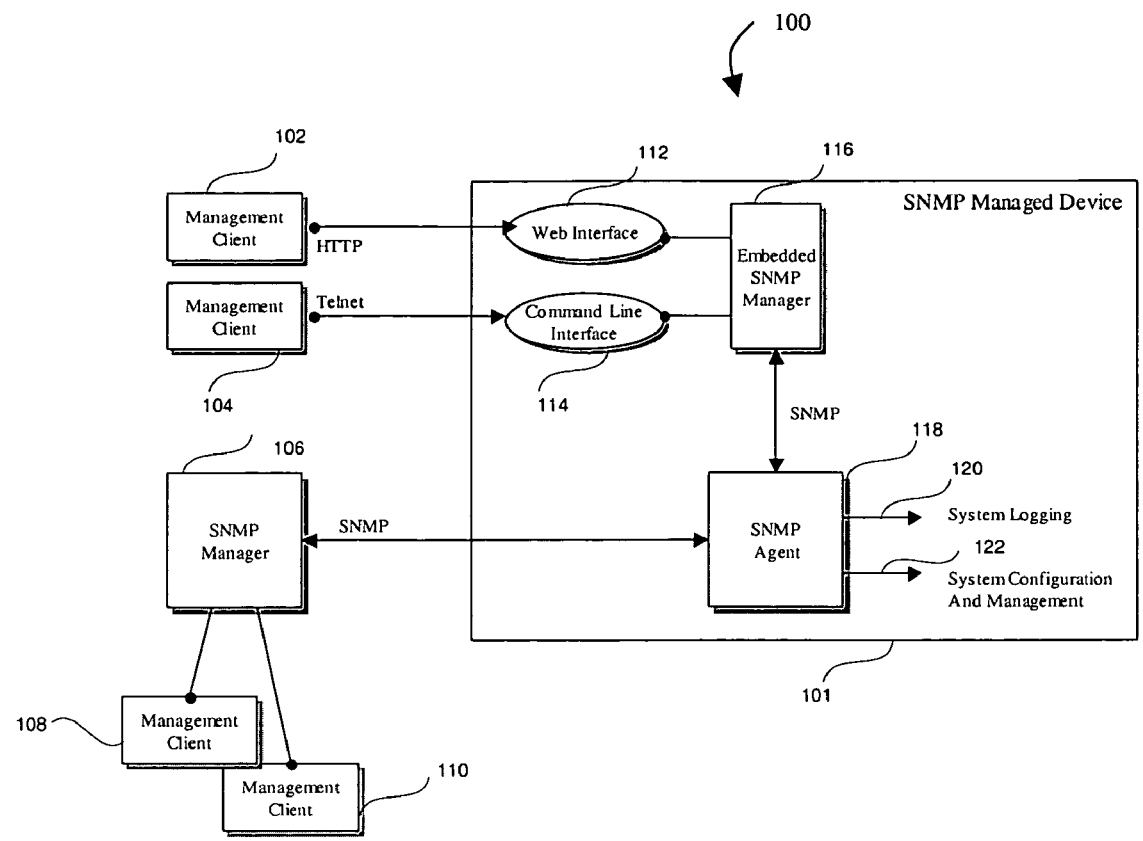
FIG. 1 presents the architecture of a communication network.

This invention improves the management of network devices that use SNMP as a management interface (see FIG. 1). It addresses the limited traceability of the Management Client originating a request provided by SNMP, and the limited status and error reporting on the result of an SNMP SET request. This invention introduces the concept of an Embedded Management Communication Channel (EMCC) that is used by an SNMP Manager and an SNMP Agent. The EMCC allows an SNMP Manager to inform an SNMP Agent of detailed information about the Management Client originating a request that includes username and IP address. It allows an SNMP Agent to inform an SNMP Manager detailed status and error information about a request that is delivered to the Management Client. An EMCC carries information in-band with the SNMP IP packet so there is no ambiguity with respect to which request the information is associated with.

The EMCC is created without modifying the standard structure of an SNMP PDU. The EMCC is added to the SNMP PDU as an additional VarBind in the VarBindList. The EMCC VarBind has a unique OID and the Value field is used to pass on the originating Management Client information and record the rich textual status and error message. Both the SNMP Agent and SNMP Manager must be EMCC aware to take advantage of this invention. They must also have a common understanding of the data transported across the EMCC.

Figure 2:
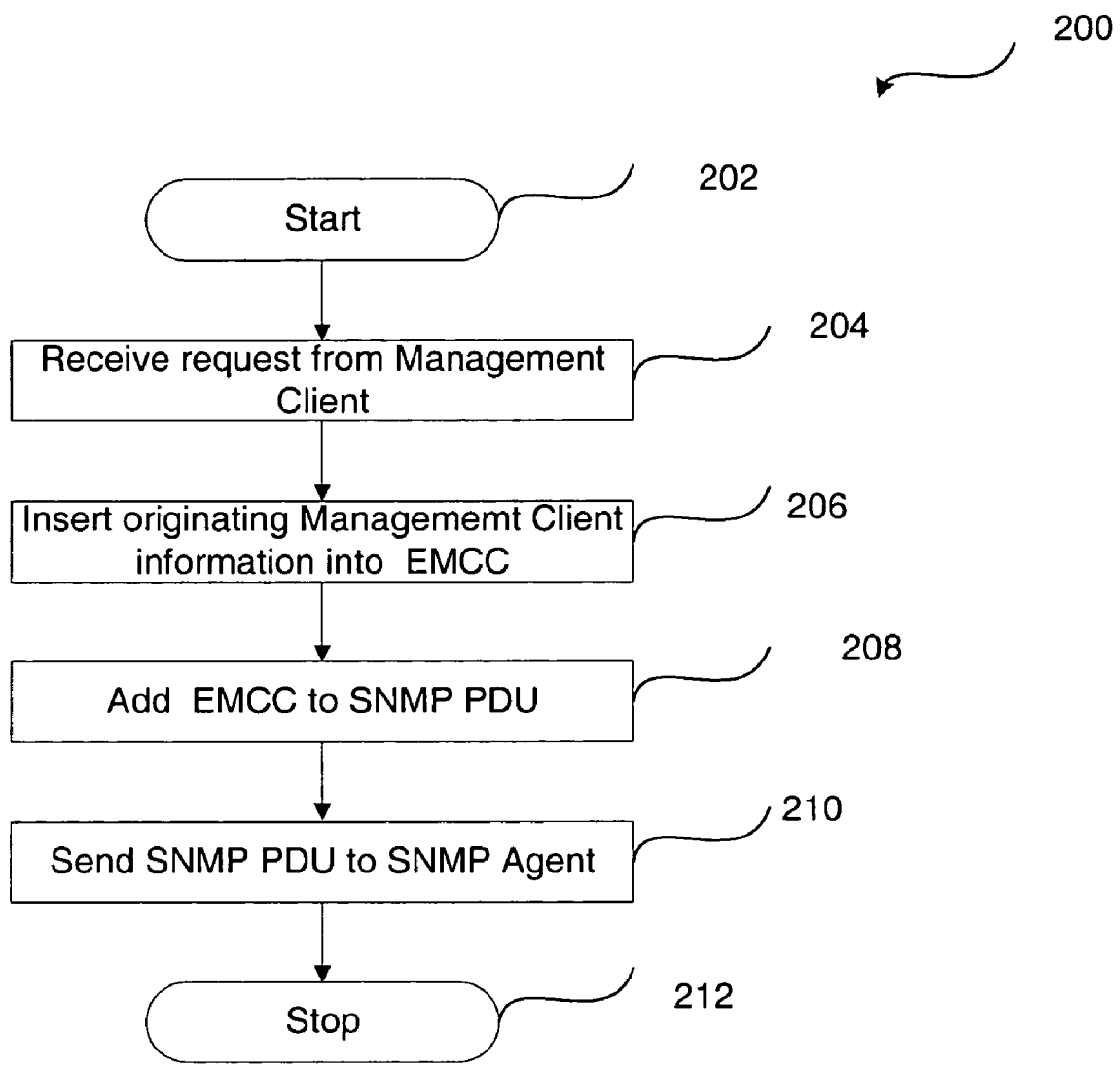
FIG. 2 shows a flowchart that illustrates the steps of the method for incorporating originating Management Client information into a request by the SNMP Manager.
Figure 3:
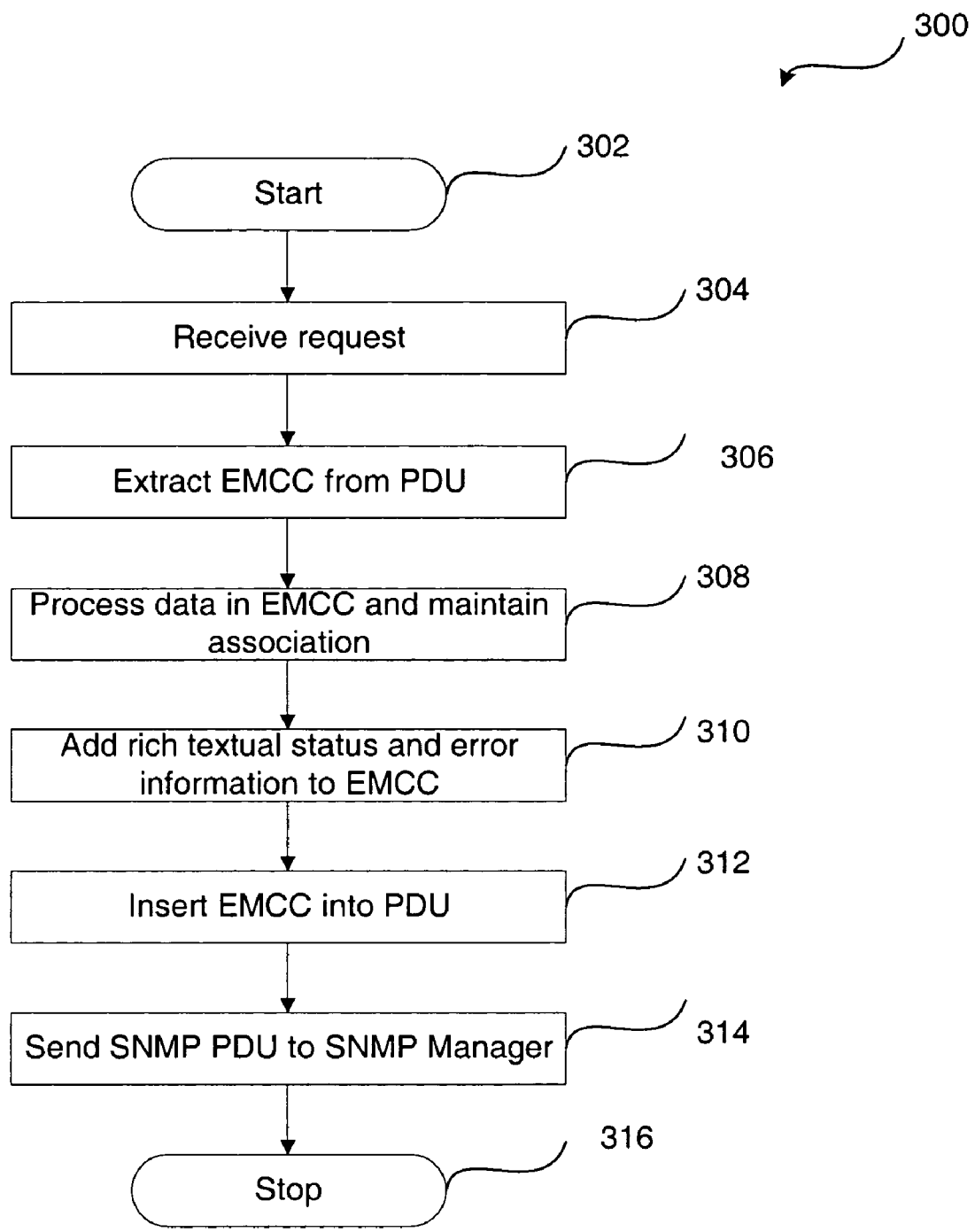
FIG. 3 shows a flowchart that illustrates the operations performed by the SNMP Agent after it receives a message from the SNMP Manager.
Figure 4:
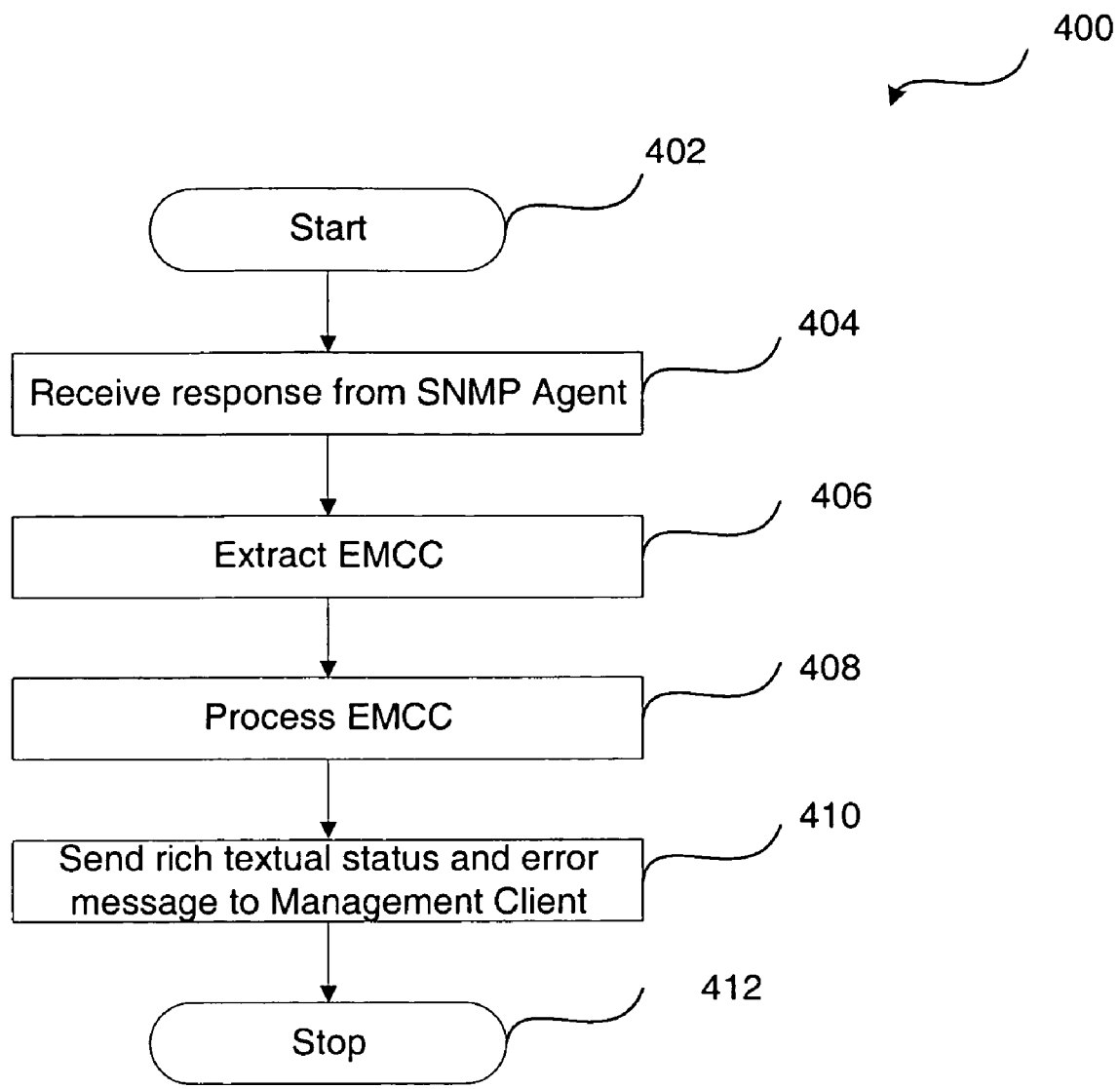
FIG. 4 shows a flowchart that illustrates the method of processing of a response by the SNMP Agent.

The methods for identifying the Management Client and for status and error reporting are explained with the flow charts presented in FIG. 2, FIG. 3 and FIG. 4.

FIG. 2 presents the method deployed at an SNMP Manager. Upon start (box 202), the SNMP Manager receives a request for the network device from a Management Client (box 204). The originating Management Client information that includes the user name and the user Internet Protocol (IP) address is then inserted in the EMCC (box 206). The EMCC is then added to the SNMP PDU (box 208) and the PDU is then sent to the SNMP Agent (box 210). After sending the PDU, the procedure exits (box 212).

FIG. 3 presents the method used by the SNMP Agent after it receives the request from the SNMP Manager. Upon start (box 302) the SNMP Agent receives the request from the SNMP Manager (box 304) and extracts the EMCC from the received PDU (box 306). The data in the EMCC is processed (box 308) to obtain the originating Management Client information and an association between the request and the Management Client is maintained. Thus, when logging user activities the SNMP Agent is able to uniquely identify the true originator of the request. The SNMP Agent prepares the response and rich textual status and error information generated after the execution of the SNMP request is then added to the EMCC (box 310). Such a message is able to clearly describe the device status and the nature of an error when it occurs on the system. The EMCC is then added to the PDU (box 312) that is then sent to the SNMP Manager (box 314). After the PDU is sent the procedure exits (box 316).

FIG. 4 presents the method deployed at the SNMP Manager when the response is received. Upon start (box 402) the SNMP Manager receives the response from the SNMP Agent. The extracted EMCC is then extracted from the received PDU (step 406). The EMCC is processed next (box 408) to obtain the originating Management Client Information and the rich textual status and error message. This message is then sent to the originating Management Client (box 410). The procedure exits in box 412.

The system used in the embodiment of this invention includes computing devices and network interfaces for intercommunication in the SNMP Managers and in the SNMP Agent. A computing device has a memory for storing the program that performs the steps of the method for identifying the Management Client originating a request for a network device and for reporting status and error response from the network device in a communication network.

Numerous modifications and variations of the present invention are possible in light of the above teachings. For example, in addition to originating Management Client information and rich textual status and error response, various other types of information may be exchanged between an SNMP Manager and the SNMP Agent through the EMCC. It is therefore to be understood that within the scope of the appended claims, the invention may be practiced otherwise than as specifically described herein.

What is claimed is:

1. A method for managing a device in a communication network using Simple Network Management Protocol (SNMP), the device including an SNMP Agent for processing a status request, the communication network further comprising at least two Management Clients residing on separate computing devices, and an SNMP Manager providing interface between the Management Client and the SNMP Agent, the method comprising:
   (a) determining a respective network address of each Management Client the network address being an Internet Protocol (IP) address
   (b) originating the status request for the device in a requesting Management Client which is one of said at least two Management Clients, and sending the status request to the SNMP Manager;
   (c) including the status request in a request Simple Network Management Protocol (SNMP) Protocol Data Unit (PDU) in the SNMP Manager;
   (d) identifying the requesting Management Client by including an Embedded Management Communication Channel (EMCC) Variable Binding (VarBind) in the request SNMP PDU, the EMCC VarBind comprising the network address of said requesting Management Client;
   (e) forwarding the request SNMP PDU to the SNMP Agent;
   (f) processing the request SNMP PDU in the SNMP Agent to generate a response SNMP PDU comprising the EMCC VarBind and a status of the device;
   (g) forwarding the response SNMP PDU to the SNMP Manager;
   (h) determining the network address of the requesting Management Client in the SNMP Manager, the network address being included in the EMCC VarBind of the response SNMP PDU; and
   (i) forwarding the response SNMP PDU from the SNMP Manager to the requesting Management Client identified by the network address.

2. The method of claim 1, the step (f) comprising:
   generating a status and error message; and
   generating an updated EMCC VarBind, including adding the status and error message to the EMCC VarBind.

3. The method of claim 2, the step (h) further comprising processing the response SNMP PDU in the SNMP Manager to obtain the information identifying said requesting Management Client.

4. The method of claim 3, the step (h) further comprising:
   extracting said status and error message from said updated EMCC VarBind; and
   sending said status and error message to said requesting Management Client.

5. The method of claim 2, the step (f) further comprising generating said status and error message in a text format.

6. The method of claim 1, the step (d) further including a user name of the user in the EMCC VarBind.

7. The method of claim 6, further comprising logging the status request in a log of the SNMP Agent and identifying said requesting Management Client in the log by the user name and the network address of the requesting Management Client.

8. A system for managing a device in a communication network using Simple Network Management Protocol (SNMP), the system comprising:
   one or more computing devices;
   at least two Management Clients, comprising a memory and instructions stored in the memory for execution by said one or more computing devices, said instructions residing on separate computing devices and causing said at least two Management Clients to communicate with the device over the communication network;
   at the device, an SNMP Agent, comprising a memory and instructions stored in the memory for execution by said one or more computing devices, for processing a status request;
   an SNMP Manager in the communication network, comprising a memory and instructions stored in the memory for execution by said one or more computing devices, providing interface between the at least two Management Clients and the SNMP Agent, said instructions causing the SNMP Manager to:
   receive the status request from a requesting Management Client, which is one of the at least two Management Clients, and generate a request Simple Network Management Protocol (SNMP) Protocol Data Unit (PDU) including the status request;
   identify the requesting Management Client by including an Embedded Management Communication Channel (EMCC) Variable Bind (VarBind) in the request SNMP PDU, the EMCC VarBind comprising information of a network address of said requesting Management Client, the network address being an Internet Protocol (IP) address;
   the instructions stored in the memory of the SNMP Agent causing the SNMP Agent to process the request SNMP PDU and generate a response SNMP PDU comprising the EMCC VarBind and a status of the device;
   the instructions stored in the memory of the SNMP Manager causing the SNMP Manager further to:
   identify the requesting Management Client by determining the network address of the Management Client in the EMCC VarBind of the response SNMP PDU; and
   forward the status of the device to the requesting Management Client identified by the network address.

9. The system of claim 8, wherein the instructions stored in the memory of the SNMP Agent comprise instructions for generating a status and error message.

10. The system of claim 9, wherein the instructions stored in the memory of the SNMP Agent further comprise:
    instructions for adding the status and error message to said EMCC VarBind to generate an updated EMCC VarBind; and
    instructions for generating a response SNMP PDU including the updated EMCC VarBind.

11. The system of claim 10, wherein the instructions stored in the memory of the SNMP Manager further comprise instructions for extracting said status and error message from said updated EMCC VarBind and sending said status and error message to said requesting Management Client.

12. The system of claim 9, wherein the instructions stored in the memory of the SNMP Agent comprise instructions for generating the status and error message in a text format.

13. The system of claim 8, wherein the instructions stored in the memory of the SNMP Manager further comprise instructions for identifying the requesting Management Client by including a user name of the user in the EMCC VarBind.

14. The system of claim 13, wherein instructions stored in the memory of the SNMP Agent further comprise instructions for logging the status request in a log of the SNMP Agent, and identifying said requesting Management Client in the log by the user name.

* * * * *